United States Patent
Pecen et al.

(10) Patent No.: US 7,269,146 B2
(45) Date of Patent: Sep. 11, 2007

(54) METHOD AND APPARATUS FOR INTERCHANGING AND PROCESSING MOBILE RADIO SUBSYSTEM CONTROL INFORMATION

(75) Inventors: Mark E. Pecen, Palatine, IL (US); Niels Peter Skov Andersen, Roskilde (DK); Stephen A. Howell, Gloucester (GB); Bonnie Chen, DeSoto, TX (US)

(73) Assignee: Motorola Inc., Schaumburg, IL (US)

( * ) Notice: Subject to any disclaimer, the term of this patent is extended or adjusted under 35 U.S.C. 154(b) by 51 days.

(21) Appl. No.: 10/689,303

(22) Filed: Oct. 20, 2003

(65) Prior Publication Data

US 2005/0083961 A1 Apr. 21, 2005

(51) Int. Cl.
*H04H 1/00* (2006.01)

(52) U.S. Cl. ...................... 370/312; 370/432

(58) Field of Classification Search ................ 370/342, 370/335, 259, 236, 270, 271, 312, 432, 522, 370/328; 455/422.1, 458, 466
See application file for complete search history.

(56) References Cited

U.S. PATENT DOCUMENTS

| | | | | |
|---|---|---|---|---|
| 5,953,659 A | * | 9/1999 | Kotzin et al. | 455/422.1 |
| 6,493,559 B1 | * | 12/2002 | Pecen et al. | 455/466 |
| 6,948,108 B1 | * | 9/2005 | Ludwig et al. | 714/748 |
| 2004/0038691 A1 | * | 2/2004 | Shin | 455/466 |
| 2004/0180675 A1 | * | 9/2004 | Choi et al. | 455/458 |
| 2004/0199662 A1 | * | 10/2004 | Karol et al. | 709/238 |
| 2004/0203849 A1 | * | 10/2004 | Allison et al. | 455/456.1 |
| 2004/0240562 A1 | * | 12/2004 | Bargeron et al. | 375/240.29 |
| 2005/0066034 A1 | * | 3/2005 | Beckmann et al. | 709/226 |

FOREIGN PATENT DOCUMENTS

WO    WO 03/015439 A1    2/2003

OTHER PUBLICATIONS

XP-002191630-3rd Generation Partnership Project; Technical Specification Group Radio Access Network; Broadband/Multicast Control BMC (Release 4).*

* cited by examiner

*Primary Examiner*—Brian Nguyen
(74) *Attorney, Agent, or Firm*—Randall S. Vaas

(57) ABSTRACT

A wireless communication system (100) is configured to send signaling messages through a cell broadcast service (CBS). CBS message pages used to transport signaling messages are identified by assigned message identifiers. Mobile devices (114) within the communication system (100) recognize the CBS messages transporting signaling messages by the message identifiers and pass the signaling messages to an appropriate application or control program module. The message identifier may be used to specify the application or control program module to process the signaling message. The signaling messages transported by the CBS may be used in controlling a multicasting or broadcasting service. Duplicate copies of the CBS message pages may be transmitted and then buffered at the mobile device (114) as they are received until all parts of the signaling message have been received.

16 Claims, 7 Drawing Sheets

METHOD AND APPARATUS FOR INTERCHANGING AND PROCESSING MOBILE RADIO SUBSYSTEM CONTROL INFORMATION

FIELD OF THE INVENTION

The present invention relates in general to signaling in wireless communication networks.

BACKGROUND OF THE INVENTION

In the last decade a great deal of cellular telephone infrastructure has been installed, and the use of cellular telephones for voice communication has become commonplace. Presently, there is an interest in enhancing the capabilities of existing cellular networks to enable high bandwidth consuming multimedia communications. It is anticipated such enhancements will enable a plethora of applications that are of benefit to consumers.

In order to contain capital expenditures rather that building entirely new networks, plans for upgrading existing cellular networks have been developed. In the case of the Global System for Mobile Communications (GSM) cellular systems General Packet Radio System (GPRS) is an enhancement that provides for low bandwidth data communications, and Enhanced Data Rates for GSM Evolution (EDGE) is a further enhancement that increases the bandwidth of GSM/GPRS systems. In spite of such enhancements, continued increases in usage of cellular networks continue to push the limits of signal channel capacity. One particular example of the need for increase signal channel capacity is in the area of multicast and broadcast services. Signal traffic is used in setting up multicasts and broadcasts. It is expected that in the near term, multicast traffic for carrying a variety programming such as sports, news, music, etc. will become popular and account for a significant fraction of network traffic. Although GPRS/EDGE is a suitable way to transport moderate data rate multicasts or broadcasts, it is inefficient for low bandwidth signaling.

Generally, it would be desirable to be able to effectively increase the signaling bandwidth of existing cellular networks without significant capital expenditures.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
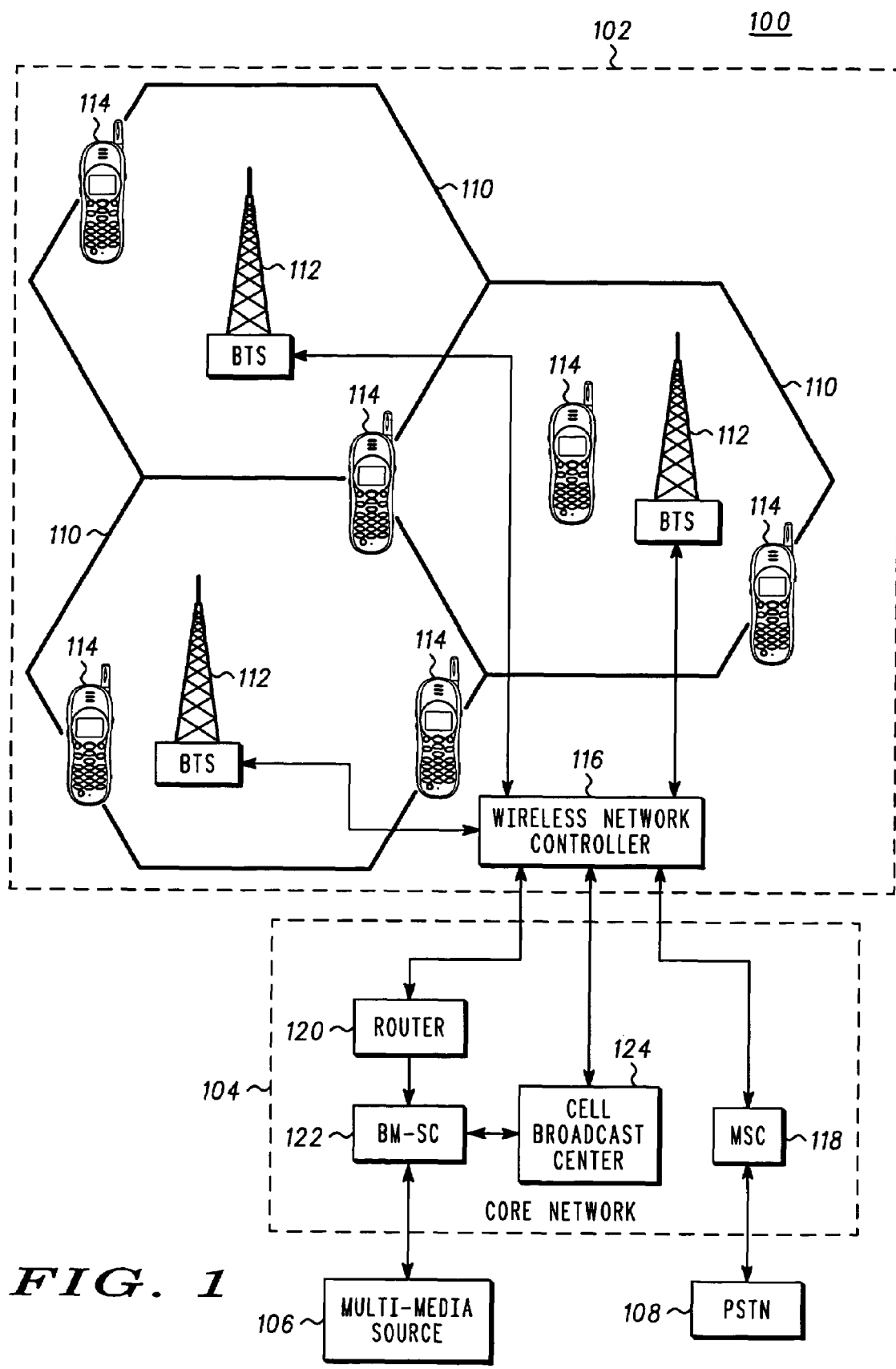
FIG. 1 is a schematic of a communication system.

FIG. 1 is a schematic of a communication system 100. The system 100 comprises a radio network 102, a core network 104, a multicast media source 106, and a public switched telephone network (PSTN) 108.

The radio network 102 is suitably configured to support Global System for Mobile Communications (GSM), General Packet Radio System (GPRS), and Enhanced Data Rates for GSM Evolution (EDGE) communications with certain advancements as described hereinbelow. The radio network 102 comprises a plurality of cells 110 each of which is served by one of a plurality base station transceivers 112. A plurality of mobile devices 114 are located within the cells 110. The mobile devices 114 are wirelessly coupled to one or more of the base station transceivers 112. A wireless network controller 116 is coupled to the base stations transceivers 112. Communications to and from the base station transceivers 112 pass through the wireless network controller 116. Although only a single wireless network controller 116 coupled to three base transceiver stations 112 is shown in FIG. 1 for the purpose of illustration, in practice communications systems may include more than the one wireless network controller 116 each of which is coupled to additional base transceiver stations 112. The wireless network controller 116 is also coupled to the core network 104.

The core network 104 comprises a mobile switching center (MSC) 118, one or more intermediate routers 120, a broadcast multicast service center (BM-SC) 122, and a cell broadcast center (CBC) 124. The MSC 118 serves as an interface between the PSTN 108 and the radio network 102. The BM-SC 122 is coupled to the multicast media source 106 for receiving media (e.g., text, audio, images, video) to be multicast or broadcast. The BM-SC 122 is also coupled through the one or more intermediate routers 120 to the wireless network controller 116. Media to be broadcast or multicast is transferred from the broadcast data source 106, through the BM-SC 122, the one or more intermediate routers 120, wireless network controller 116, and the base transceiver stations 112 to the mobile devices 114. The BM-SC 122 automates management of broadcasts in the communication system 100.

The BM-SC 122 is also coupled to the CBC 124 and the CBC 124 is also coupled to the wireless network controller 116. The CBC 124 suitably supports short message service (SMS) cell broadcast service (CBS) communication with certain improvements described hereinbelow. In the communication system 100, signaling messages issued by the BM-SC 122 and alternatively by other equipment in the core network 104 are encapsulated within CBS messages issued by the CBC 124. The coupling of the BM-SC 122 to the CBC 124 facilitates the use of the CBC 124 by the BM-SC 122 to send signaling messages into the radio network 102, carried in CBS messages. Sending, receiving, and processing of signaling messages encapsulated in CBS messages is described more fully below with reference to FIGS. 4-7.

Figure 2:
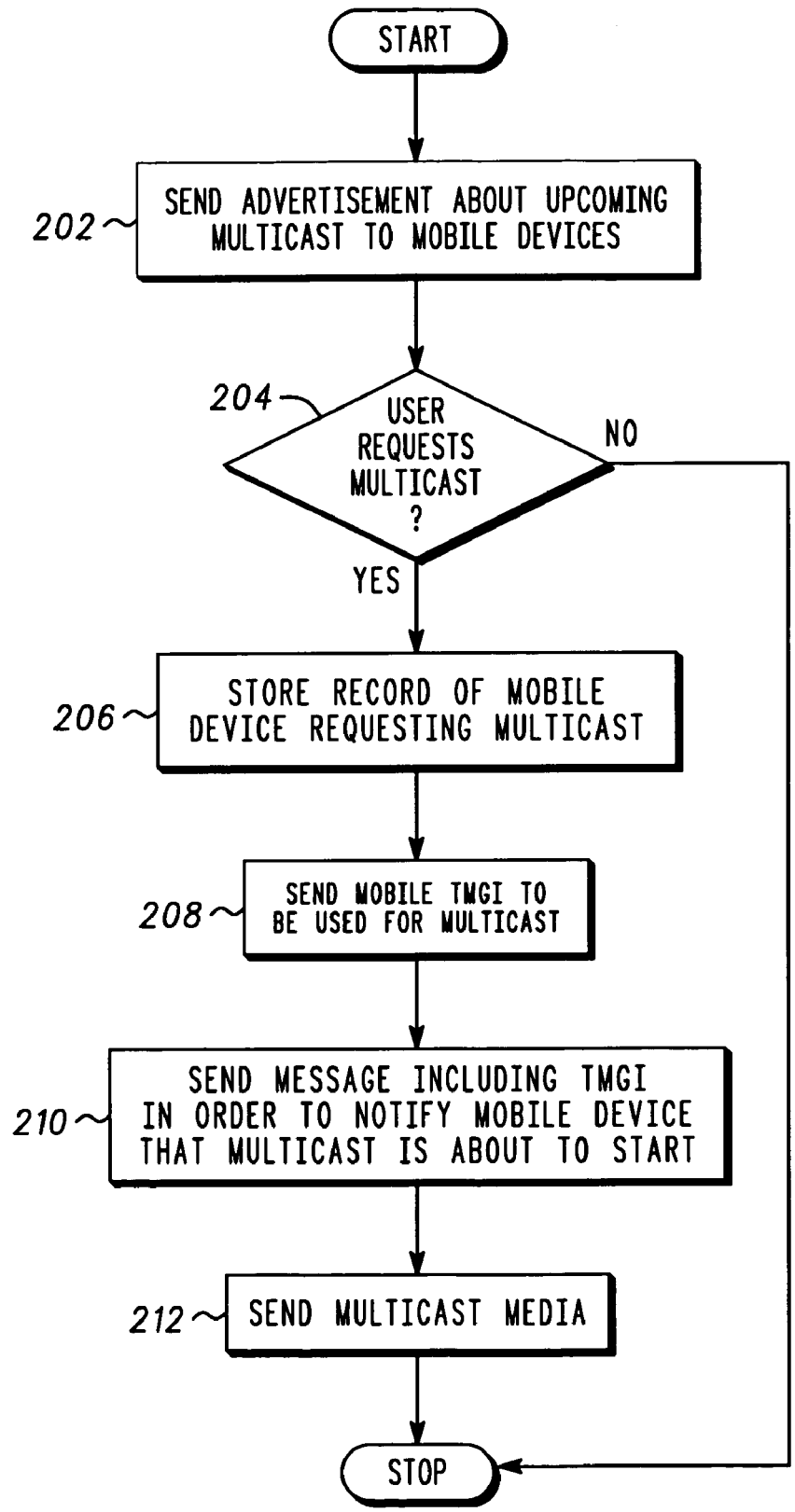
FIG. 2 is a flowchart showing an overview of actions performed by network infrastructure of the system shown in FIG. 1, in preparing to send and sending a multicast.
Figure 3:
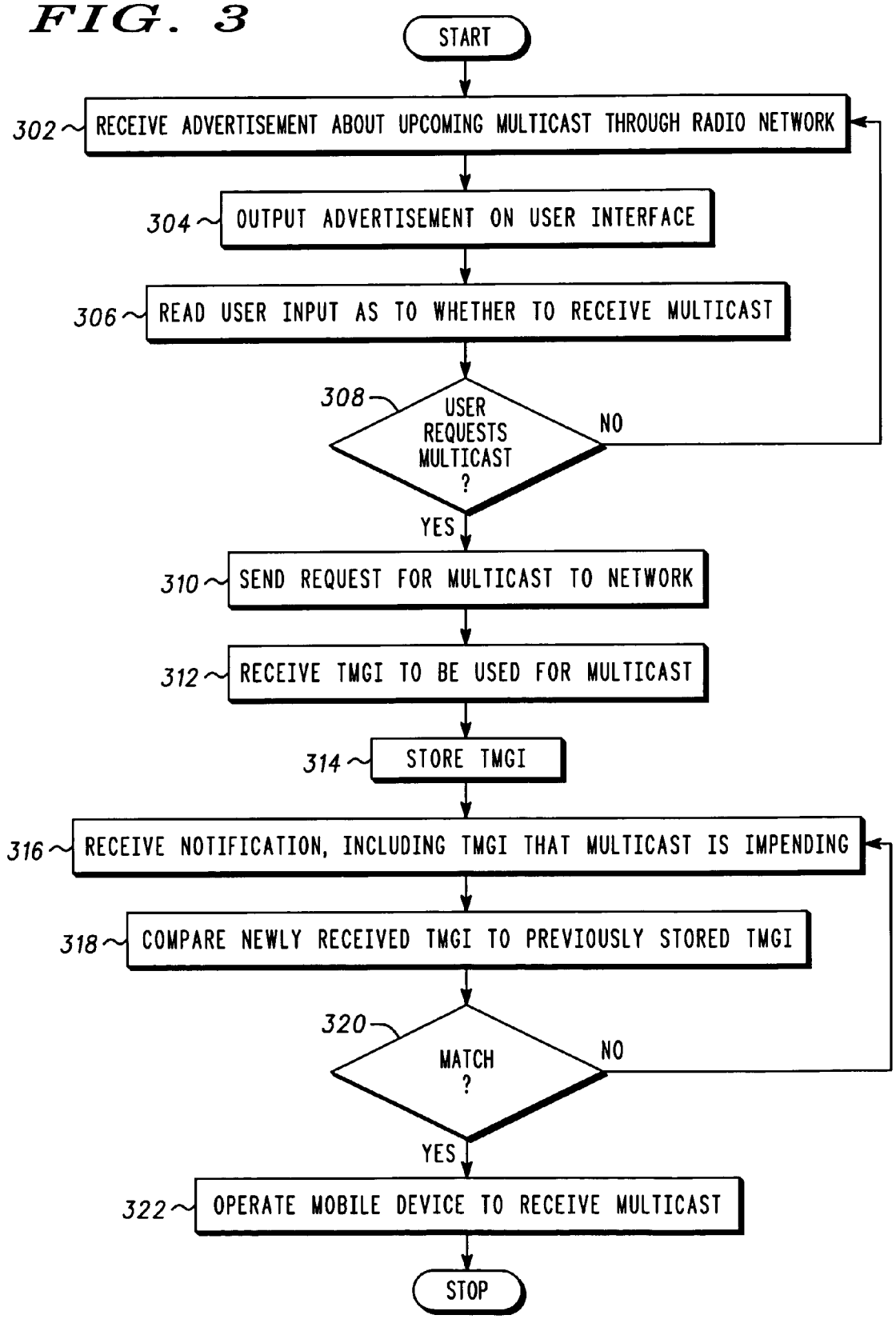
FIG. 3 is a flowchart showing an overview of actions performed by mobile devices in the system shown in FIG. 1, in preparing to receive and receiving a multicast.

In FIGS. 2-3 show overviews of processes for coordinating the sending of multicasts within the communication system 100 are shown. In particular, FIG. 2 is a flowchart showing an overview of actions performed by network infrastructure of the communication system 100 shown in FIG. 1, in preparing to send and sending a multicast. The term 'infrastructure' typically denotes fixed parts of the system 100 other than mobile devices 114. (Note, however that notwithstanding this meaning, it is also anticipated that one or more of the mobile devices 114 can serve, in lieu of the multicast media source 106, as the source of broadcast media which is sent through the communication system 100 to other mobile devices 114.

Referring to FIG. 2, in step 202 an advertisement about an upcoming multicast is sent from the core network 104, suitably from the BM-SC 122 to the mobile devices 114. The advertisement includes information to be output through user interface components (e.g., display screens or loudspeakers) of the mobile devices 114. The advertisement sent in step 202 is suitably sent encapsulated in the payload of one or more CBS packets according to the process illustrated in FIG. 4. In step 202 the advertisement is suitably broadcast to all active mobile devices 114. By contrast, blocks 204-212 which follow, are performed for each mobile separately.

Block 204 is a decision block the outcome of which depends whether a user of a particular mobile device 114 has responded to the advertisement by requesting the upcoming multicast (e.g., by activating a hyperlink). If the user of the particular mobile device 114 does not request the upcoming multicast, then the process illustrated in FIG. 2 terminates for that particular mobile device 114.

If on the other hand the user of the particular mobile device 114 requests the upcoming multicast, then the process continues with block 206 in which a record indicating that the particular mobile device 114 requested the multicast is stored (e.g., in the BM-SC 122). Each particular user device is recognized by a device ID that is included in communications.

In block 208 a signaling message including a Temporary Mobile Group Identity (TMGI) to be used in the setting up the upcoming multicast is sent to the particular mobile device 114. The mobile device may then use the TMGI to receive data packets associated with the multicast. A substantial delay may occur between the execution of the blocks 202-208 which occur when the upcoming multicast is advertised and subsequent blocks 210-212 which occur shortly before or during the multicast.

In block 210 a signaling message including the TMGI that was sent in block 208, is broadcast to the mobile devices 114. The signaling message sent in block 210 is also suitably sent using the CBS using the processes illustrated in FIG. 4. The signaling message sent in block 210 optionally includes information to control discontinuous receive operation of the mobile devices. Such information can take the form of a time (expressed as a frame number) at which to start operating to receive a multicast.

In block 212 multicast media itself is sent. Each mobile device 114 that requested the multicast will have configured itself to receive the multicast media in response to signaling message sent in block 210. The multicast media is suitably sent using GPRS/EDGE.

In an alternative case that a broadcast as opposed to a multicast is to be set up, there is no need to execute blocks 204, 206 in order to ascertain and store information as to which of the mobile devices 114 requested the broadcast. For a broadcast it is appropriate to execute blocks 202, 208-210, however in the case of a broadcast it would be appropriate, in block 208, to use the CBS to send the TMGI.

FIG. 3 is a flowchart showing an overview of actions performed, by mobile devices 114 in the communication system 100 shown in FIG. 1, in preparing to receive and receiving a multicast. The actions illustrated in FIG. 3 are performed in response to and in coordination with the actions shown in FIG. 2. Referring to FIG. 3, in block 302 the advertisement about the upcoming multicast which was sent in block 202 is received from the radio network 202 at a particular mobile device 114. The nature of the type of message, i.e., multicast advertisement is recognized by the mobile device 114 by reading the message identifier of CBS packets in which the advertisement is transported.

In block 304 the advertisement is output through user interface components of the mobile device 114. The advertisement, depending on what type of media is used, is suitably output as text, a web page on a display 830 (FIG. 8) of the mobile device 114, and/or audio.

In block 306 user input as to whether to receive the upcoming multicast is read. Block 306 is suitably performed using a graphical user interface (GUI) such as a microbrowser, or using speech recognition to determine the users articulated response.

Block 308 is a decision block the outcome of which depends on whether the user requested the multicast, as indicated in the input read in block 306. If not then the mobile device 114 loops back to block 302 in which further multicast advertisements are received.

If, on the other hand, the user has input a request for the multicast, then in block 310 a request for the multicast is sent by mobile device 114 to the BM-SC 122, and in response thereto, in block 312 the TMGI sent in block 208 is received by the mobile device 114.

In block 314 the TMGI received in block 312 is stored in the mobile device 114 for subsequent use in recognizing announcements of impending or ongoing multicasts that the mobile device 114 user has subscribed.

As indicated in block 316, sometime later, suitably a short time before the multicast is about to commence the signaling message sent in block 210 giving notification that the multicast is impending is received by the mobile device 114. The signaling message received in block 316 includes a TMGI assigned to a particular multicast. The purpose of the signaling message received in block 316 is recognized using the CBS message identifier which suitably differs from the message identifier of the message received in block 302 in order to differentiate the two types of signaling messages. The signaling messages sent in block 210 is optionally repeated after the multicast has started in order to notify mobile devices 114 that did not receive the signaling message when first sent.

In block 318 the TMGI received in block 316 is compared to the TMGI previously received in block 312 in response to the user's request to received the advertised multicast. Block 320 is a decision block the outcome of which depends on whether a match is found in the comparison performed in block 318. If not then the mobile device 114 waits until further notifications of impending multicasts which are received in block 316. If on the other hand a match is found, meaning that the multicast which the user of the mobile device 114 previously requested is impending, then in block 322 the mobile device 114 operates to receive the multicast. Operating to receive the multicast includes demodulating and decoding a channel e.g., a GPRS/EDGE channel through which the multicast is sent. In the case that the message sent in block 210 indicates a time at which the mobile device 114 is to start receiving the multicast, the mobile device 114 waits until that time before executing block 322.

In the aforementioned alternative case in which a broadcast as opposed to a multicast is to be set up it is not necessary to ascertain the user's interest in receiving the broadcast, therefore blocks 306-310 need not be included in the process.

Figure 4:
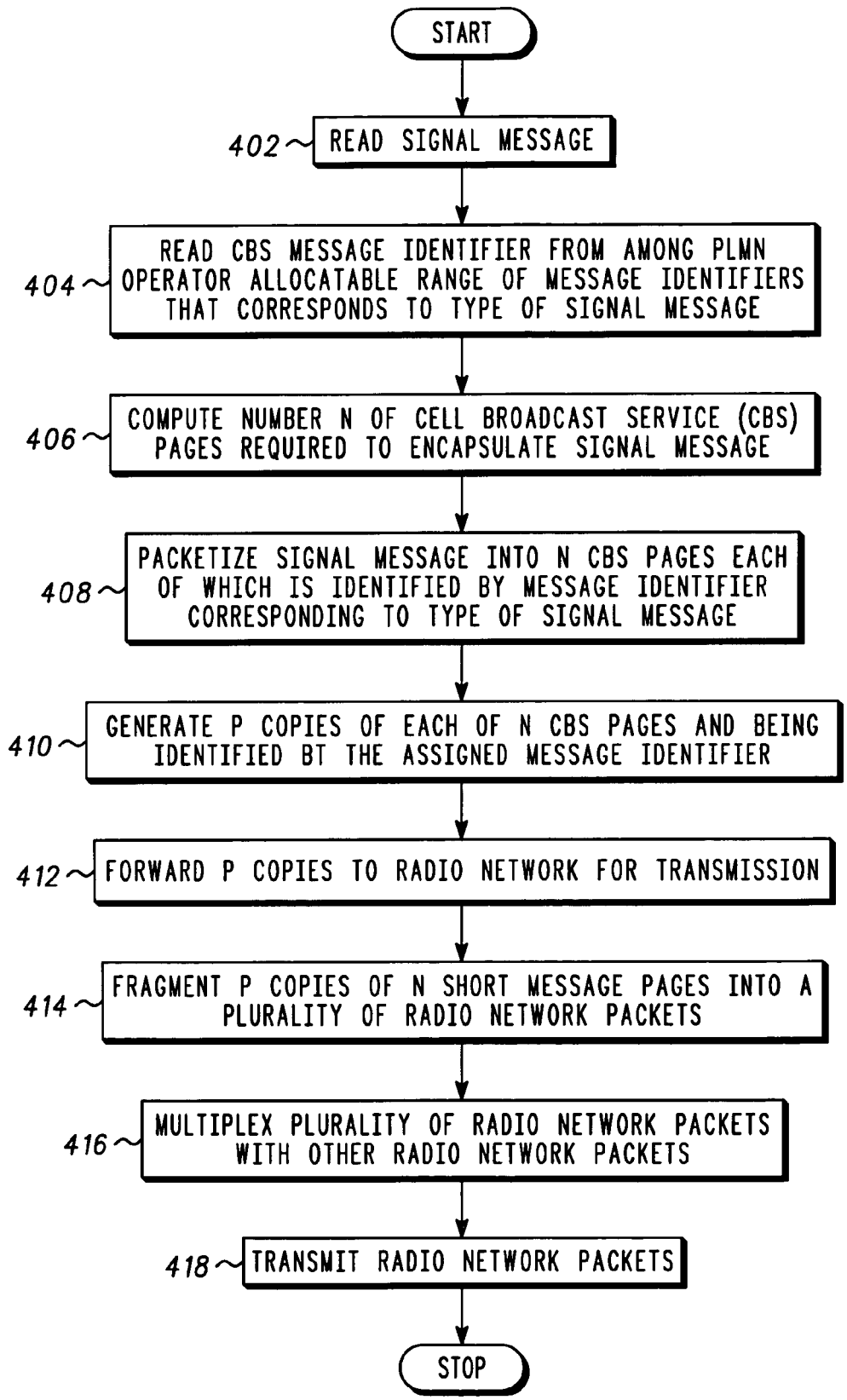
FIG. 4 is a flowchart showing actions, performed by infrastructure of the system shown in FIG. 1, to reliably send a signaling message through a cell broadcast service.

FIG. 4 is a flowchart showing actions, performed by infrastructure of the communication system 100 shown in FIG. 1, to reliably send a signaling message through the CBS. The process illustrated in FIG. 4 is suitably used to send the signaling messages that are sent in blocks 202, 210 and received in blocks 302, 316. The process illustrated in FIG. 4 utilizes a GSM CBS channel which is generally underutilized relative to its capacity, and thereby avoids using the Broadcast Control Channel (BCCH) and the Packet Broadcast Control Channel (PBCCH) which are often overburdened in GSM networks.

Referring to FIG. 4, in block 402 a signaling message to be sent through the system 100 is read. The signaling message read in block 402 is for example the advertisement sent in block 202 or the message notifying mobile devices 114 of an impending multicast or broadcast sent in block 210. The signaling message read in block 402 is suitably received from the MB-SC 122.

In block 404 a CBS message identifier that corresponds to the type of control message read in block 402 is read. GSM sets aside a range of message identifiers that Public Land Mobile Network (PLMN) operators may assign for special purposes. Particular message identifiers from this range are suitably used to designate particular signaling messages. The message identifier is included along with other information in headers of CBS messages. The content and organization of CBS message headers is shown in Table 1.

TABLE 1

| OCTET NUMBER | FIELD |
| --- | --- |
| 1-2 | Serial Number |
| 3-4 | Message Identifier |
| 5 | Data Coding Scheme |
| 6 | Page Parameter |
| 7-88 | Payload |

Each CBS message includes a payload of 82 octets. The page parameter field of the CBS message header indicates a page number, and a total number of pages. The page parameter field facilitates distributing a large message of up to 15 CBS message pages (packets). The serial number is used to identify a particular CBS message.

Referring again to FIG. 4, in block 406 a number N of CBS message pages required to encapsulate the signaling message read in block 402 is calculated. For short signaling messages N may equal one.

In block 408 the signaling message read in block 402 is packetized into N CBS message pages. Each CBS message pages is identified by the message identifier read in block 404.

In block 410 a number P of copies of each CBS message page created in block 408 is generated. Multiple copies created in block 410 increase the probability that at least one complete copy of the signaling message can be reconstructed at the mobile device 114 even though the mobile device may not be able to decode consecutive frames for a sufficient duration to receive any one of the P copies completely because of a conflicting GPRS/EDGE reception schedule that takes a higher priority. It is desirable to be able to use the CBS channel to transport signaling messages especially those related to MBMS in a communication system, such as shown in FIG. 1, supporting GPRS/EDGE because GPRS/EDGE is a suitable way to send MBMS content particularly relatively high bandwidth content multimedia. Creating P copies of each CBS message page carrying signaling messages allows CBS message pages to be used to carry signaling messages in a system that uses GPRS/EDGE.

In block 412 the P copies of the N CBS message pages encapsulating the signaling message are forwarded to the radio network 102. Note that not all P copies need to be forwarded at once. One copy can be forwarded, then after a delay another copy and so on, until all copies have been forwarded.

In block 414 the P copies of the N CBS message pages are fragmented into a plurality of radio network packets. Radio network packets are typically smaller than one CBS message page, so that multiple radio network packets are required to transport one CBS message page. In GSM four radio network packets are required to transport each CBS message page.

In block 416 the plurality of radio network packets are multiplexed with other radio network packets, e.g., other radio network packets carrying CBS messages, and in block 418 the radio network packets are transmitted.

Figure 5:
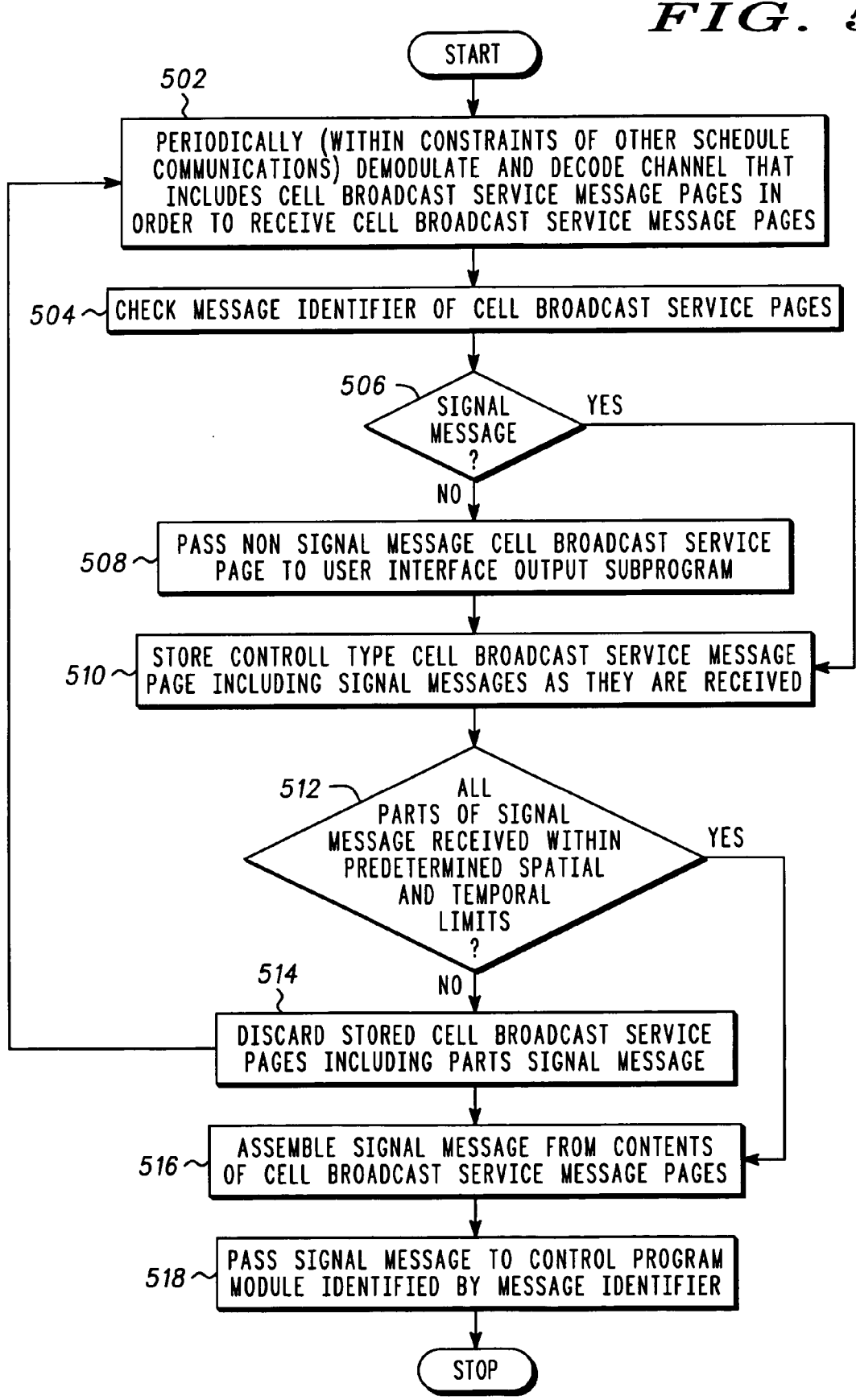
FIG. 5 is a flowchart showing actions performed, by mobile devices in the system shown in FIG. 1, to reliably receive a signaling message through a cell broadcast service.

FIG. 5 is a flowchart showing actions performed, by mobile devices 114 in the system 100 shown in FIG. 1, to reliably receive a signaling message through a cell broadcast service. The process illustrated in FIG. 5 is executed by mobile devices 114 to receive messages sent by infrastructure of the system 100 operating according to the process shown in FIG. 5.

Referring to FIG. 5, in block 502 each mobile device 114 periodically, within constraints imposed by other higher priority scheduled communications (e.g. GPRS/EDGE), demodulates and decodes a channel that carries CBS message pages in order to receive CBS message page.

In block 504 the mobile device 114 checks the message identifier of each CBS message page to determine the type of the CBS message page. The mobile device 114 is preprogrammed to associate certain values of the message identifier with certain types of CBS message pages. Certain values, or ranges of message identifier, are used to identify CBS message pages bearing signaling messages.

Block 506 is a decision block the outcome of which depends on whether each CBS message page is determined to bear a signaling message based on the message identifier.

If it is determined based on the message identifier that a CBS message page does not bear a signaling message, then in block 508 the CBS message page or contents there of are passed to a user interface output (e.g., display, 830, FIG. 8) subprogram of the mobile device 114 in order to be output to the user.

If on the other hand it is determined in block 506 based on the message identifier, that a particular CBS message page carries a signaling message or part thereof, then in block 510 then the CBS message page, or alternatively at least a part of the CBS message page is stored in a memory that serves as a buffer.

Block 512 is a decision block the outcome of which depends on whether all pages that constitute a complete CBS message are received within certain temporal and spatial limits. Although some of the P copies of some of the N message pages may not be received due to scheduling conflicts, sending more than one copy of each message pages increases the chance that a complete CBS message can be reconstructed. In determining if all pages are received, the page parameter field of the CBS message pages, which indicates a page number of each particular CBS message page, and a total number of pages in a complete CBS message of which the particular CBS message page is a part is used. The temporal limit may be a specified maximum allowable time period between the time at which a first CBS message page is received, and a time at which a last remaining CBS message page of a complete CBS message is received. The temporal limit may be expressed in terms of frame number. The spatial limit may for example require that all the CBS message pages of a complete CBS message are received within one cell, or within one PLMN. Blocks 502-510 continue to be executed until the temporal or spatial limits are exceeded.

If all parts of the signaling message are not received in the spatial and temporal limits, then the stored CBS message pages carrying parts of the signaling message are discarded. After discarding the stored CBS message pages the process loops back to block 502 to receive further CBS message pages. If on the other hand the CBS message pages carrying all parts of the signaling message are received then in block 516 the signaling message is assembled from the contents of the CBS message pages.

Thereafter in block 518 the signaling message is passed to a control or application program module that handles signaling message of the type identified by the message identifier. Each message identifier corresponds to a program module (e.g., a subprogram, application program interface (API) or method) in the mobile device 114 that uses signaling messages of the type identified by the message identifier. In case only one program module in the mobile device 114 uses signaling message received through the CBS, the message identifier that indicates that the contents of CBS message page are a signaling message implicitly identifies the one control program. Examples of types of program modules that can utilize signaling messages transported in CBS messages include applications, such as those that receive and display stock quotes, local weather, driving and emergency information, advertising and others.

The process of reliably sending CBS messages, by sending duplicate copies, and caching CBS message pages received within spatial and temporal limits, until a complete CBS message is received is taught in U.S. Pat. No. 6,493,559 which is assigned in common with the present invention. U.S. Pat. No. 6,493,559 is hereby incorporated herein by reference.

Using the processes illustrated in FIGS. 4-5 effectively increases the availability of bandwidth for signaling in GSM networks by allowing the CBS channel to be used for signaling. Moreover, processes illustrated in FIGS. 4-5 allow the CBS channel to be reliably used for signal in GSM networks that used EDGE.

According to an embodiment described below with reference to FIGS. 6-7 message identifiers used to identify CBS message pages carrying signaling messages are dynamically assigned.

Figure 6:
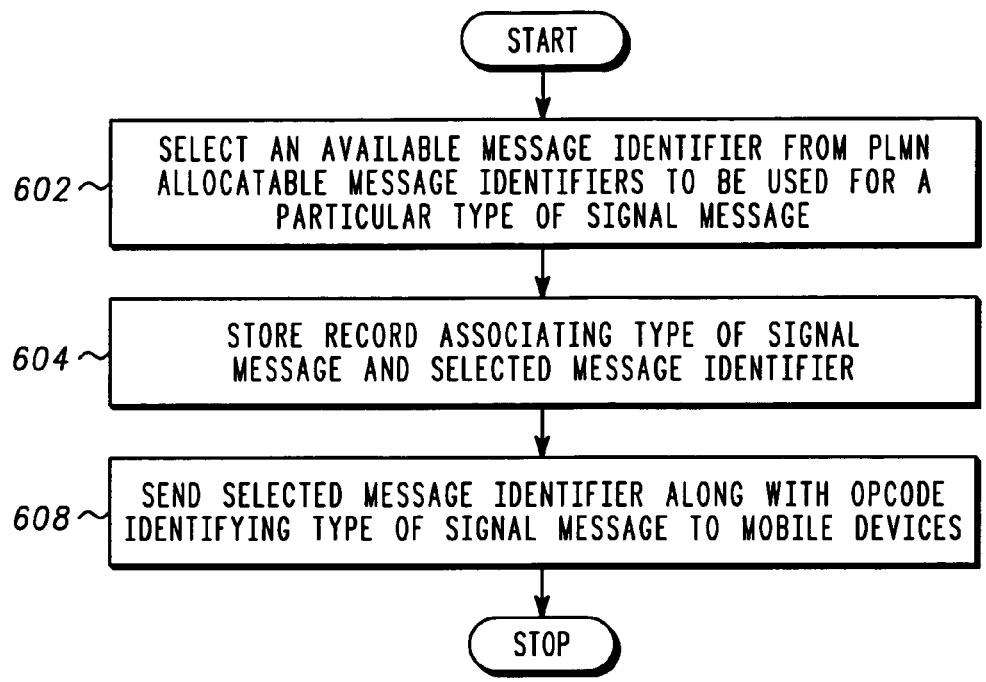
FIG. 6 is a flowchart showing actions performed, by network infrastructure of the system shown in FIG. 1, to dynamically assign a message identifier to identify a particular type of signaling message.

FIG. 6 is a flowchart showing actions performed, by network infrastructure of the system 100 shown in FIG. 1, to dynamically assign a message identifier to identify a particular type of signaling message. In block 602 an available message identifier is selected from the range of PLMN allocatable message identifiers to be used for a particular type of signaling message. The message identifier can for example be a next available message identifier in a list of message identifiers that are not currently in use, or a can be selected at random from available message identifiers.

In block 604 a record associating a type of signaling message with the selected message identifier is stored in the infrastructure.

In block 606 the selected message identifier is sent to a mobile device 114, for example through a GPRS channel, along with an opcode that specifies an application corresponding to the particular type of signaling message. The meaning of the opcode is preprogrammed into the mobile devices 114.

The infrastructure of the communication system 100 is now ready to operate as shown in FIG. 4 with a dynamically assigned message identifier.

Figure 7:
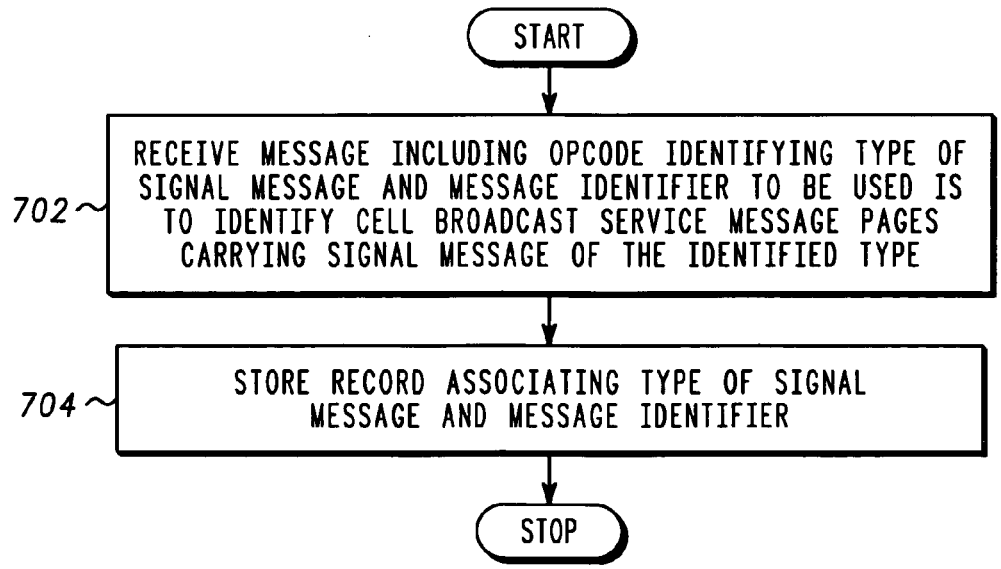
FIG. 7 is a flowchart showing actions performed, by mobile devices of the system shown in FIG. 1, in recording dynamic assignment of message identifiers used to identify particular types of signaling message.

FIG. 7 is a flowchart showing actions performed, by mobile devices 114 of the system shown in FIG. 1, in recording dynamic assignment of message identifiers used to identify particular types of signaling message. FIG. 7 shows actions performed in coordination with the actions performed by the infrastructure of the network 100 shown in FIG. 6.

Referring to FIG. 7, in step 702 the message sent in block 606 is received by the mobile device, and in block 704 a record is stored in the mobile device 114 that associates the received message identifier with a type of signaling message that is to be processed by a particular subprogram and that is specified by the received opcode. The mobile device 114 is now ready to execute the process shown in FIG. 5, and in particular, in block 518, is able to pass signaling messages carried in CBS messages to appropriate program modules based on the message identifier included in the signaling messages.

The processes shown in FIGS. 6-7 serve to dynamically assign message identifiers for identifying particular types of signaling messages.

According to an alternative embodiment, a header of a signaling message packet, and contents of the signaling message packet are transmitted in different CBS messages that are identified by different message identifiers. Using separate message identifiers for CBS messages carrying header and contents of signaling messages facilitates passing the header and contents to different subprograms which are specialized for handling each part of the signaling message.

Note that although specific parts of the communication system 100 illustrated in FIG. 1 have been referenced in describing actions illustrated in FIGS. 2-7, alternatively equipment having other designations, and/or a communication system having other equipment and/or a configuration other than illustrated in FIG. 1 is used to perform the processes illustrated in FIGS. 2-7.

Infrastructure of the communication system 100 is configured by hardware design and/or software programming to perform the processes illustrated in FIGS. 2, 4, 6. The mobile devices 114 are configured by hardware design and/or software programming to perform the processes illustrated in FIGS. 3, 5, 7. Software for configuring the infrastructure of the communication system 100 to perform the processes illustrated in FIGS. 2, 4, 6 and software for configuring the mobile devices 114 to perform the processes illustrated in 3, 5, 7 can be stored on computer readable media, such as for example hard disk drives, magnetic tape, hard disk drives. Network can also serve as a computer readable medium for temporarily storing such software.

Figure 8:
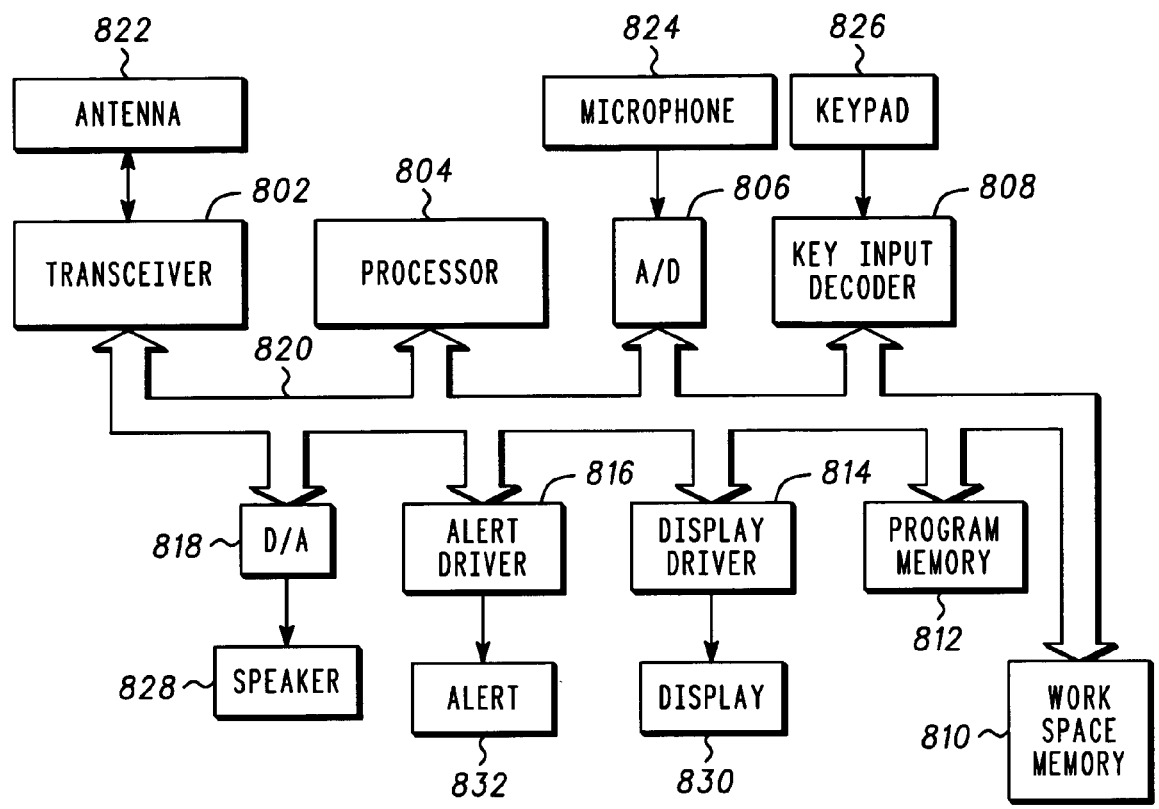
FIG. 8 is a functional block diagram of one of the mobile devices used in the system shown in FIG. 1.

FIG. 8 is a functional block diagram of one of the mobile devices 114 used in the communication system 100. As shown in FIG. 8 the mobile device 114 comprises a transceiver 802, a processor 804, an analog to digital converter (A/D) 806, a key input decoder 808, a work space memory 810, a program memory 812, display driver 814, an alert driver 816, and a digital to analog converter (D/A) 818 coupled together through a signal bus 820.

The transceiver module 802 is coupled to an antenna 822. Carrier signals that are modulated with data, e.g., audio data, pass between the antenna 822, and the transceiver 802.

A microphone 824 is coupled to the A/D 806. Audio, including spoken words, is input through the microphone 824 and converted to digital format by the A/D 806.

A keypad 826 is coupled to the key input decoder 808. The key input decoder 808 serves to identify depressed keys, and provide information identifying each depressed key to the processor 804.

The D/A 818 is coupled to a speaker 828. The D/A 818 converts decoded digital audio to analog signals and drives the speaker 828. The display driver 814 is coupled to the display 830.

The alert driver 816 drives an alert 832. The alert 832 is activated when wireless communication signals (e.g., a wireless telephone call, or optionally multicasts or broadcasts) are received by the mobile device 114, in order to draw the user's attention to the received wireless communication signals. The alert 832 is suitably an audible alert or a tactile alert. The alert 832 may comprise a loudspeaker.

The program memory 812 is used to store programs that control the mobile device 114, including a program that executes the processes shown in FIGS. 3, 5, 7. The programs stored in the program memory 812 are executed by the processor 804. The program memory 812 is one type of computer readable medium.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

The invention claimed is:

1. A method of communicating signaling messages in a wireless communication network, the method comprising:
   reading a signaling message, that is of a particular type;
   reading a message identifier assigned to the particular type of signaling message;
   packetizing the signaling message within one or more cell broadcast service pages, each of which includes the message identifier;
   transmitting the one or more cell broadcast service pages; and
   prior to reading the message identifier assigned to the particular type of signaling message:
   selecting the message identifier and assigning a particular message identifier to the particular type of signaling message;
   transmitting the message identifier along with an opcode that specifies a particular signaling message type to be processed by a program module; and
   receiving the message identifier along with the opcode.

2. The method according to claim 1 wherein reading a signaling message comprises:
   reading a signaling message including a temporary mobile group identity for a multicast or broadcast service.

3. The method according to claim 1 wherein reading a signaling message comprises:
   reading a signaling message that controls discontinuous reception operation.

4. The method according to claim 1 further comprising:
   making one or more duplicate copies of the one or more cell broadcast service pages; and
   transmitting the one or more duplicate copies.

5. The method according to claim 1 further comprising:
   prior to transmitting the one or more cell broadcast service pages:
   fragmenting each of the one more cell broadcast service pages into a plurality of radio network packets; and
   multiplexing the plurality of radio network packets with additional radio network packets.

6. The method according to claim 1 further comprising:
   receiving at least some of the one or more cell broadcast service pages;
   checking the message identifier in the at least some of the one or more cell broadcast service pages; and
   in a case that the signaling message is completely received and the message identifier indicates that the one or more cell broadcast service pages carry the signaling message:
   forwarding the signaling message to a program module identified by the message identifier.

7. A method of communicating signaling messages in a wireless communication network, the method comprising:
   reading a signaling message, that is of a particular type;
   reading a message identifier assigned to the particular type of signaling message;
   packetizing the signaling message within one or more cell broadcast service pages, each of which includes the message identifier;
   transmitting the one or more cell broadcast service pages;
   making one or more duplicate copies of the one or more cell broadcast service pages;
   transmitting the one or more duplicate copies of the one or more cell broadcast service pages;
   receiving at least some of the duplicate copies of the one or more cell broadcast service pages; and
   prior to forwarding the signaling message, buffering at least parts of at least some of the one or more cell broadcast service pages, and the one or more duplicate copies of the one or more cell broadcast service pages;
   assembling the signaling message from the at least parts of at least some of the one or more cell broadcast service pages and the one or more duplicate copies of the one or more cell broadcast service pages.

8. A method of operating a device to receive messages in a wireless communication network comprising:
- receiving a plurality of cell broadcast service pages including one or more cell broadcast service pages that carry one or more signaling messages;
- checking message identifiers of the plurality of cell broadcast service pages to ascertain which of the plurality of cell broadcast service pages carry the one or more signaling messages; and
- passing the one or more signaling messages to a program module;
- receiving one or more duplicate copies of one or more of the one or more cell broadcast service pages;
- buffering at least a part of each of the one or more cell broadcast service pages and duplicate copies; and
- assembling the one or more signaling messages from the buffered cell broadcast service pages and duplicate copies.

9. The method according to claim 8 wherein passing the one or more signaling messages comprises:
- passing the one or more signaling messages to a program module specified by the message identifiers.

10. A wireless communication device comprising:
- a transceiver;
- a computer readable medium storing a program for operating the wireless communication device;
- a processor coupled to the transceiver for receiving received information and coupled to the computer readable medium for receiving the program, wherein the processor is programmed by the program to:
- receive a plurality of cell broadcast service pages including one or more cell broadcast service pages that carry one or more signaling messages;
- check message identifiers of the plurality of cell broadcast service pages to ascertain which of the plurality of cell broadcast service pages carry the one or more signaling messages;
- pass the one or more signaling messages to a program module;
- receive one or more duplicate copies of one or more of the one or more cell broadcast service pages;
- buffer at least a part of each of the one or more cell broadcast service pages and duplicate copies; and
- assemble the one or more signaling messages from the buffered cell broadcast service pages and duplicate copies.

11. The wireless communication device according to claim 10 wherein the processor is programmed to:
- pass the one or more signaling messages to a program module specified by the message identifiers.

12. A wireless communication system comprising:
- a means for reading a signaling message, that is of a particular type;
- a means for reading a message identifier assigned to the particular type of signaling message;
- a means for packetizing the signaling message within one or more cell broadcast service pages, each of which includes the message identifier;
- a means for transmitting the one or more cell broadcast service pages:
- a means for making one or more duplicate copies of the one or more cell broadcast service pages;
- a means for transmitting the one or more duplicate copies of the one or more cell broadcast service pages;
- a means for receiving at least some of the duplicate copies of the one or more cell broadcast service pages; and
- a means for, prior to forwarding the signaling message, buffering at least parts of at least some of the one or more cell broadcast service pages, and the one or more duplicate copies of the one or more cell broadcast service pages; and
- a means for assembling the signaling message from the buffered cell broadcast service pages and duplicate copies.

13. The wireless communication system according to claim 12 wherein the means for reading the signaling message comprises:
- a means for reading a signaling message including a temporary mobile group identity for a multicast or broadcast service.

14. The wireless communication system according to claim 12 wherein the means for reading the signaling message comprises:
- a means for reading a signaling message that control discontinuous reception operation.

15. The wireless communication system according to claim 12 further comprising:
- a means for fragmenting each of the one more cell broadcast service pages into a plurality of radio network packets; and
- a means for multiplexing the plurality of radio network packets with additional radio network packets.

16. The wireless communication system according to claim 12 further comprising:
- a means for receiving at least some of the one or more cell broadcast service pages;
- a means for checking the message identifier in the one or more cell broadcast service pages; and
- in case the signaling message is completely received and the message identifier indicates that the one or more cell broadcast service pages carry the signaling message:
- forwarding the signaling message to a program module identified by the message identifier.

* * * * *